United States Patent [19]

Boothroyd et al.

[11] Patent Number: 4,608,633
[45] Date of Patent: Aug. 26, 1986

[54] METHOD FOR DECREASING EXECUTION TIME OF NUMERIC INSTRUCTIONS

[75] Inventors: Donald C. Boothroyd, Phoenix; John E. Wilhite; Robert W. Norman, Jr., both of Glendale; Howard J. Keller, Scottsdale, all of Ariz.

[73] Assignee: Honeywell Information Systems Inc., Phoenix, Ariz.

[21] Appl. No.: 481,202

[22] Filed: Apr. 1, 1983

[51] Int. Cl.[4] .............................................. G06F 9/34
[52] U.S. Cl. ................................................... 364/200
[58] Field of Search ... 364/200 MS File, 900 MS File

[56] References Cited

U.S. PATENT DOCUMENTS

| 3,889,243 | 6/1975 | Drimak | 364/200 |
| 3,918,027 | 11/1975 | Lechner | 371/69 |
| 4,197,579 | 4/1980 | Otis, Jr. et al. | 364/200 |
| 4,228,500 | 10/1980 | Webster | 364/200 |
| 4,370,712 | 1/1983 | Johnson et al. | 364/200 |
| 4,388,687 | 6/1983 | Twibell et al. | 364/200 |

Primary Examiner—Thomas M. Heckler
Attorney, Agent, or Firm—A. A. Sapelli; J. S. Solakian; A. Medved

[57] ABSTRACT

The present invention relates to a method within a digital computer system for reading operand data stored in a temporary storage memory in a forward or reverse direction. The method includes loading the temporary storage memory with the first and second operand data strings in a pre-established order such that the subsequent fetching of the operand data words from the temporary storage memory is performed in a sequential order. The loading and fetching steps operate to achieve a desired word order such that the operation between operand data strings can be started while the operand data is being fetched.

1 Claim, 15 Drawing Figures

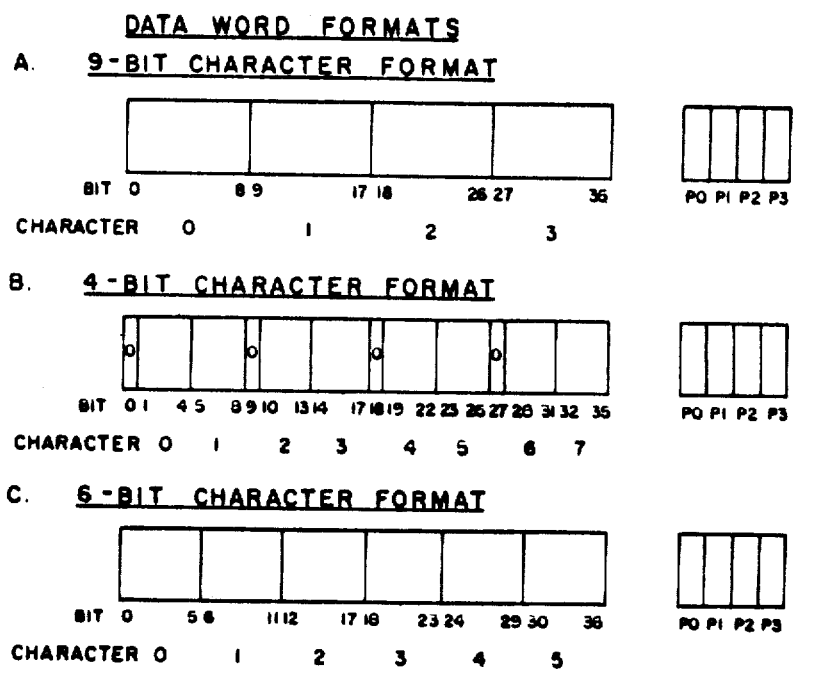
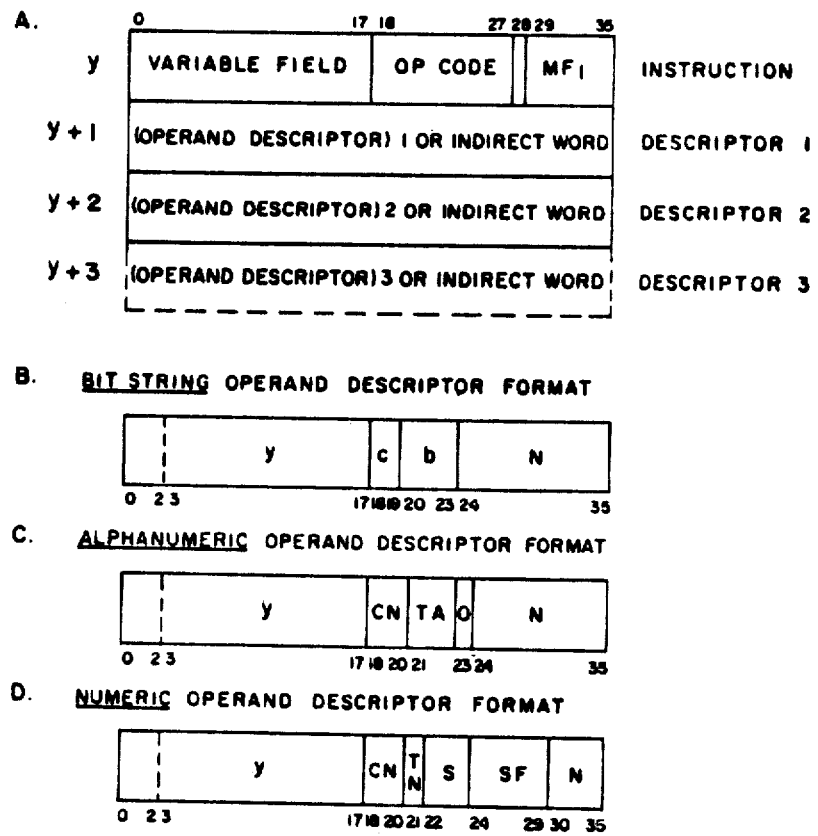

FIG. 8

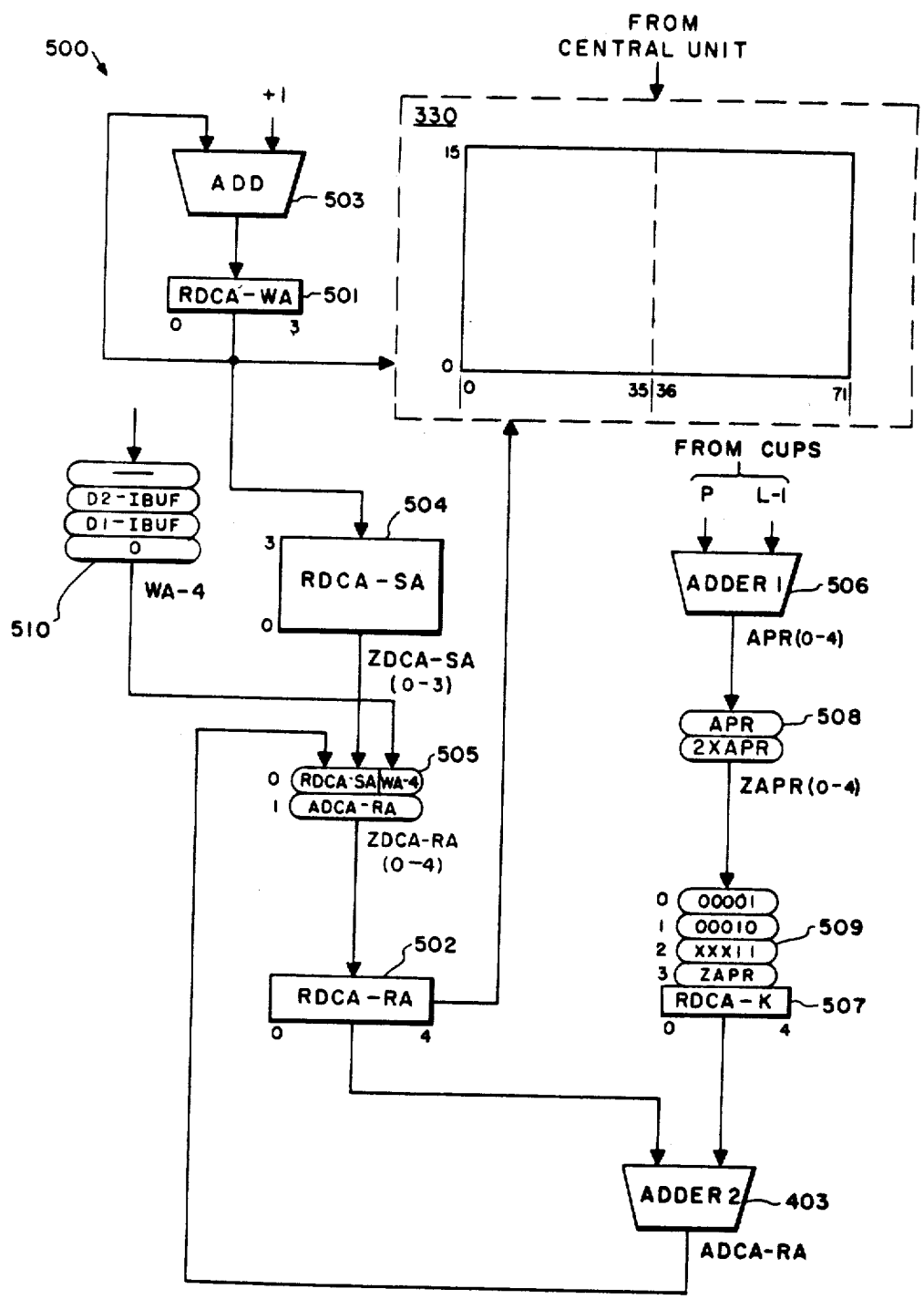
F I G. 10

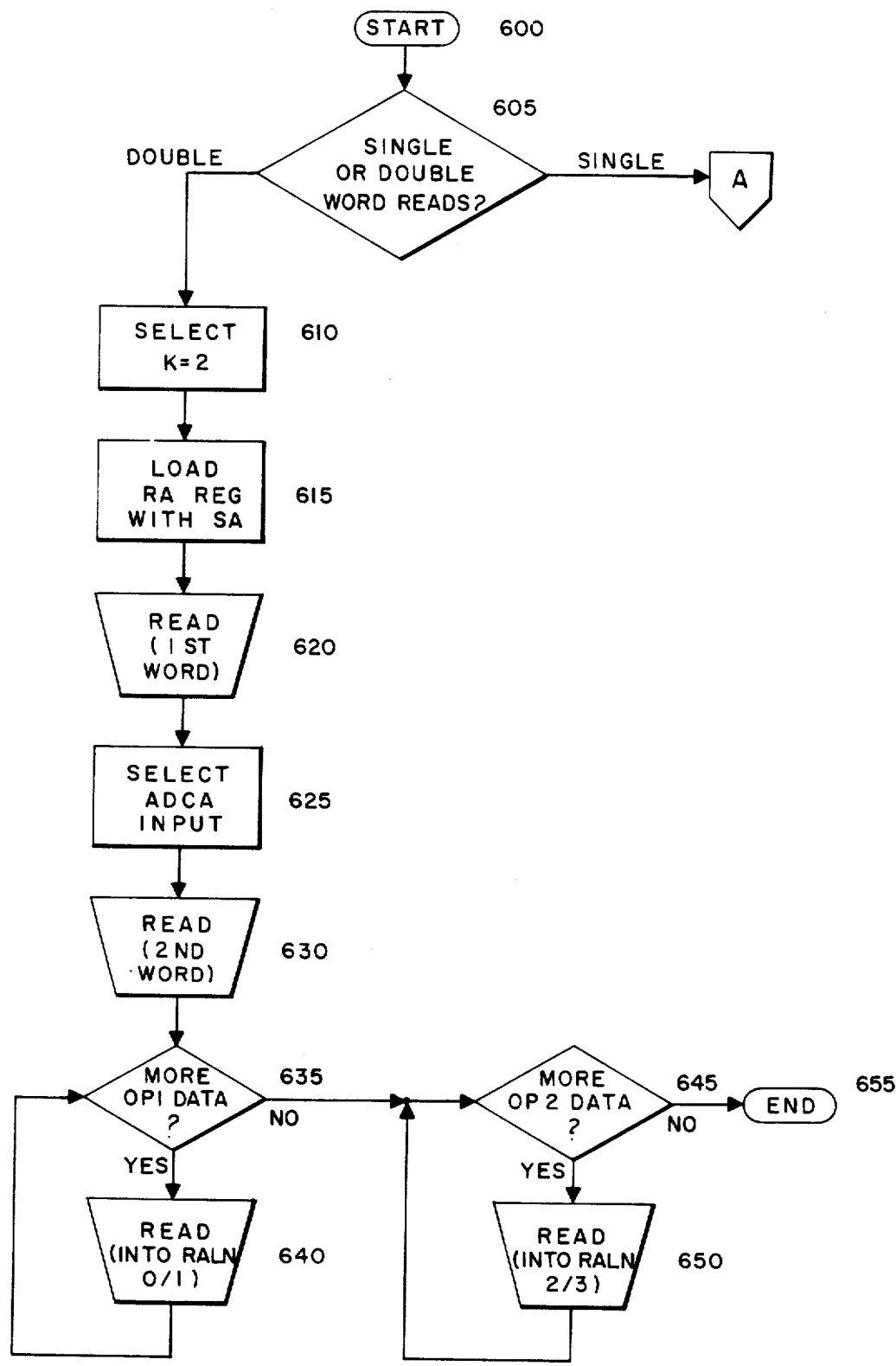
F I G. 14A

METHOD FOR DECREASING EXECUTION TIME OF NUMERIC INSTRUCTIONS

RELATED PATENT APPLICATIONS

The present patent application is related to the following U.S. Patent Applications and U.S. Patent, which are assigned to Honeywell Information Systems Inc., the assignee of the present application, all of the references listed below being incorporated by reference herein, to the extent necessary for an understanding of the present invention.

1. Apparatus for Aligning and Packing a First Operand Into a Second Operand of a Different Character Size, by Donald C. Boothroyd et al, Ser. No. 394,952, filed on July 2, 1982;
2. Data Alignment Circuit, by Donald C. Boothroyd et al, Ser. No. 394,951 filed on July 2, 1982;
3. Collector, by R. Guenthner, G. Edington, L. Trubisky, and J. Circello, Ser. No. 434,129, filed Oct. 13, 1982;
4. A Pipelined Decimal Character Execution Unit, by Donald C. Boothroyd et al, Ser. No. 481,224, filed on even date herewith;
5. Apparatus for Detecting a Predetermined Character of a Data String, by Donald C. Boothroyd et al, Ser. No. 481,226, filed on even date herewith;
6. Data Available Indicator for an Exhausted Operand String, by Donald C. Boothroyd et al, Ser. No. 481,227, filed on even date herewith;
7. Apparatus for Forward or Reverse Reading of Multiple Variable Length Operands, by Donald C. Boothroyd et al, Ser. No. 481,225, filed on even date herewith;
8. U.S. Pat. No. 4,268,909, entitled "Numeric Data Fetch-Alignment of Data Including Scale Factor Difference", by Kindell et al.
9. Wraparound Buffer for Repetitive Decimal Numeric Operations, by Donald C. Boothroyd et al, Ser. No. 481,228, filed on even date herewith.

BACKGROUND OF THE INVENTION

This invention relates to a method of operational control of a digital computer system, and more particularly, to a method for reading operand data stored in a temporary storage memory in a forward or reverse direction, wherein the operand data can be multiple variable length operands, thereby decreasing the overall execution time of a numeric instruction.

An objective, which almost always faces designers furthering the advancement of digital computers, is to decrease the time required for executing each of the instructions executed by the digital computer, thereby decreasing the overall time required by the digital computer to perform a predefined task and increasing the efficiency of the digital computer. Many schemes have been devised by digital computer designers in an attempt to meet this objective. In the execution of some instructions, the reading of stored operand data in a reverse direction can be helpful in speeding up the execution time of the instruction. Reverse reading of an operand (i.e., reading from least significant bit (LSB) to most significant bit (MSB) rather than a normal read of MSB to LSB) can be especially useful in arithmetic operations such as addition in which the adding operations are performed LSB to MSB. The capability to reverse read therefore allows execution to start without having to wait for the entire operand data read to be completed.

Therefore, there is provided by the method of the present invention a technique for reading operand data stored in a temporary storage memory (i.e., stack) in either a forward or reverse direction.

SUMMARY OF THE INVENTION

Therefore, there is provided by the present invention a method of obtaining first and second operand data strings, in a predetermined sequence, from a memory unit, wherein each of the first and second operand data strings includes a plurality of operand data words. The method of the present invention comprises the steps of loading the operand data words of the first and second operand data strings in a pre-established order in the memory unit, and fetching the operand data words in essentially a sequential order from the memory unit. The loading and fetching steps are such that operation between the first and second operand data strings can begin while the operand data words are being obtained.

Accordingly, it is an object of the present invention to provide a method for reading data stored in a memory in a forward or reverse direction.

It is still another object of the present invention to provide a method for forward or reverse reading of multiple variable length operands.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 3 shows a plurality of data word formats of the central processing unit;

FIG. 4 shows the instruction word and descriptor word formats of the computer word of the central processing unit having a system configuration utilizing a plurality of execution units, including a decimal character unit;

FIG. 8 shows a format of the decimal character unit instruction and descriptor words;

FIG. 10 shows a block diagram of the preferred embodiment of the forward/reverse read apparatus of the present invention;

FIGS. 14a and 14b, which together comprise FIG. 14, show flow diagram of the steps performed by the control logic in reading the operand data of the temporary storage memory, stack A 330.

DETAILED DESCRIPTION

Figure 1:
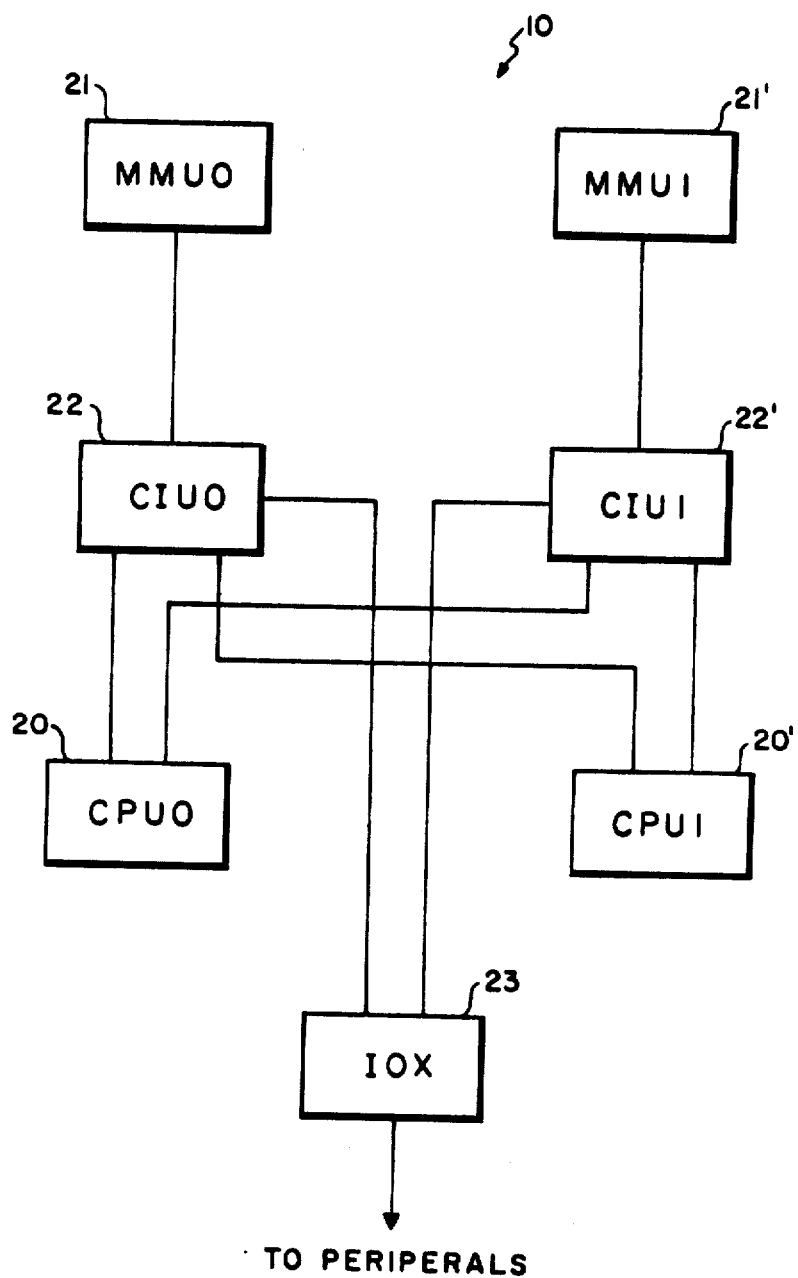
FIG. 1 shows a block diagram of a data processing system having a plurality of modules, including a central processing unit.

The present invention finds particular application in a decimal character execution unit for executing a predetermined class of instructions, namely decimal arithmetic and character operations. Before describing the present invention, it will be helpful to understand its operating environment, which will now be described. Referring to FIG. 1, a central processing unit (CPU) is shown as a module of a data processing system (DPS) 10. A first central processing unit (CPU 0) 20 and a second central processing unit (CPU 1) 20' comprise the CPU modules of DPS 10, each having full program execution capability and performing the actual information processing of the data processing system 10. CPU 0 20 and CPU 1 20' are each operatively connected to a first main memory unit (MMU0) 21 and a second main memory unit (MMU1) 21', through a first central interface unit (CIU 0) 22 and a second central interface unit (CIU 1) 22', respectively. MMU 0 and MMU 1 store programs and data utilized by CPU 0 and CPU 1. CIU 0 and CIU 1 act as the memory managers for the respective memories. CIU 0 and CIU 1 are each connected to an input/output multiplexer (IOX) 23 which provides an interface between the MMU and the various system peripherals. All CPU communication and interaction with other system modules is via the CIU. The DPS 10 of FIG. 1 shows a two CPU/two CIU configuration. It will be understood by those skilled in the art that various configurations are possible, including a single CIU/CPU configuration.

Figure 2:
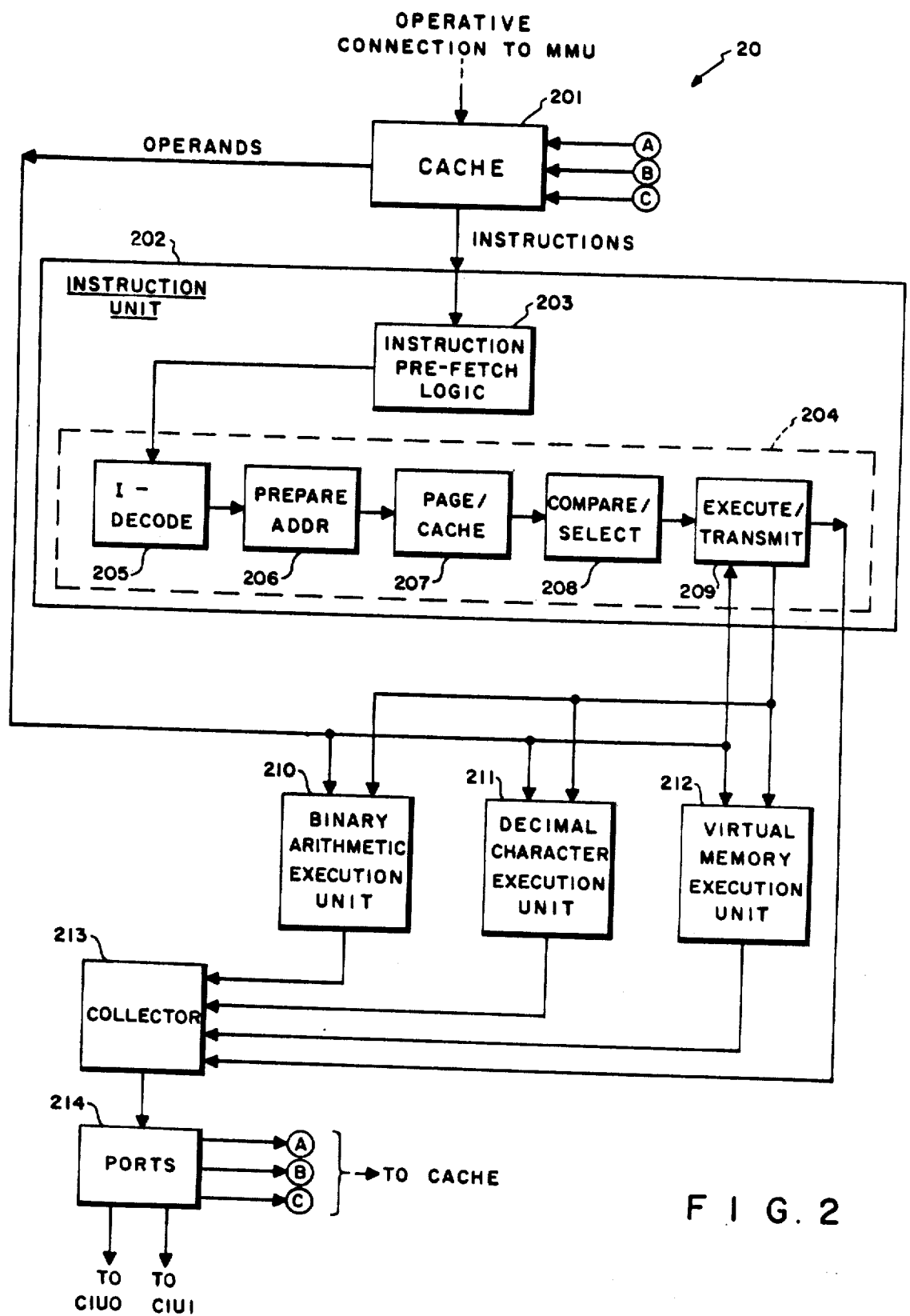
FIG. 2 shows a block diagram of the central processing unit in which a decimal character unit can be found.

Referring to FIG. 2, there is shown a block diagram of the preferred embodiment of the CPU 20 in which the present invention may be found. A cache memory (or more simply cache) 201 is provided for storing small blocks of words read from the main memory unit 21. The small blocks of words stored in cache 201 contain some instruction words and data words (or operand words) which will presently be executed and operated on by the execution units of CPU 20. An instruction unit 202 is included which comprises an instruction prefetch logic 203 and an instruction execution pipeline 204. The instruction prefetch logic 203 provides the instruction execution pipeline 204 with a supply of instructions to be executed. This is accomplished by including logic to predict the instruction sequence, prefetching instruction words from the cache memory 201, and storing them within the instruction prefetch logic block 203. The instruction execution pipeline 204 (also referred to herein as a central unit pipeline structure (CUPS)) performs the steps required for the execution of a instruction in individual stages. The first stage (I-DECODE) 205 receives the instruction to be executed from the instruction prefetch logic 203 and decodes the instruction. The second stage (Prepare Address) 206 prepares the virtual address. The third stage (Page/Cache) 207 performs a paging operation of the operand address and cache directory lookup. The fourth stage (Compare/Select) 208 initiates an operand access from cache 201 or from the main memory unit 21 in the case of a cache miss. The fifth stage (Execute/Transmit) 209 performs the actual execution of the instruction or dispatches information to an appropriate execution unit for execution.

In the preferred embodiment of the CPU, while all instructions must pass through all five stages of the central unit pipeline structure 204, not all instructions are fully executed in the fifth stage 209 of the pipeline. Some instructions are transmitted to other execution units outside the central unit pipeline structure 204, while the central unit pipeline structure 204 continues execution of succeeding instructions. The fifth stage 209 includes a basic operations execution unit (not shown) and central execution unit (not shown). The basic operations execution unit (not shown) performs the execution of those predetermined instructions which may be classified as basic operations. These are mostly very simple instructions requiring one or two cycles, including fixed point arithmetic (except multiply and divide), boolean operations, fixed point comparisons, register loads and shift operations. The central execution unit (not shown) executes a different set of predetermined instructions which refer to other instructions, move the contents of address registers or address related quantities between registers and storage, or alter processor stages.

Three additional instruction execution units are provided outside the central unit pipeline structure 204. A binary arithmetic execution unit 210 (BINAU) performs the execution of both binary and hexadecimal arithmetic operations and a fixed point multiply and divide. A decimal character execution unit (DECCU) 211 executes instructions involving decimal arithmetic, move and translate operations, character manipulations and binary string operations. The virtual memory execution unit (VMSM) 212 performs the execution of many privileged instructions including segment descriptor register manipulation, and handling fault and interrupt situations which manipulate the respective fault and interrupt registers. Each of the aforementioned execution units receives operands from the cache 201, and instructions (or commands) and descriptors from logic (not shown) of the fifth stage 209. Further, each execution unit usually operates independently of any activity occurring in the other execution units.

A collector execution unit, or more simply collector, 213 is the execution unit for most store instructions and is also the final execution unit involved in all other instructions. The collector 213 retrieves results from various results stacks of the other execution units, and updates cache 201 through a ports unit 214. The collector 213 also keeps a master copy of all program visible registers (not shown). The collector 213 permits the execution units to generate results independently and at different rates of speed, then updates the respective registers and cache in the original program sequence. The collector is more fully described in U.S. patent application Ser. No. 434,129 filed Oct. 13, 1982, entitled "Collector" by R. Guenthner, G. Edington, L. Trubisky, and J. Circello, assigned to the same assigness as the present application, the aforementioned application being incorproated by reference herein to the extent necessary for an understanding of the present invention. The ports unit 214 handles the CIU/CPU command interface processing, and the hierarchy control communication, i.e., the CIU/CPU memory hierarchy.

Although the preferred embodiment of the CPU 20 described above includes among its features paging, a 5-stage pipeline, instruction prefetch, virtual addressing, etc., it will be understood by those skilled in the art that the architecture of the DPS 10 or the CPU 20 described above is in no way intended to limit the decimal character execution unit 211 (or more simply decimal character unit) or to limit the present invention incorporated into the decimal character unit.

Referring to FIG. 3, there is shown a 36-bit computer word of the preferred embodiment having a nine-bit character format, a four-bit character format, and a six-bit character format. The nine-bit character format (FIG. 3A) utilizes 9 bits to define a character, bits 0–8, 9–17, 18–26, and 27–35 defining characters 0, 1, 2 and 3, respectively. The four-bit character format (FIG. 3B) utilizes four bits to define a character, bits 1–4, 5–8, 10–13, 14–17, 19–22, 23–26, 28–31, and 32–35, defining characters 0, 1, 2, 3, 4, 5, 6 and 7, respectively. Characters 0 and 1 of the four-bit character format are defined by dividing character 0 of the nine-bit character format in half. The remaining bit assigned to the high order bit (i.e., the left most bit as shown in the figure), bit 0, is essentially a "don't care" or "irregular" bit. Likewise, characters 2 and 3, 4 and 5, and 6 and 7, of the four-bit character format is defined by dividing characters 1, 2, and 3 of the nine-bit character format, respectively, in half. The high order bit, or don't care bit, of the four-bit character format word, bits 0, 9, 18 and 27 can always be set to zero. The six-bit character format (FIG. 1C) utilizes 6 bits to define a character, bits 0–5, 6–11, 12–17, 18–23, 24–29, and 30–35 defining characters 0, 1, 2, 3, 4, and 5 respectively. Four additional bits in both the 9 and 4 bit character formats $P_0$, $P_1$, $P_2$, and $P_3$, can be carried along as the parity bits of respective characters. The "don't care" bit of the four-bit character bit is utilized, in the preferred embodiment, as a parity bit, and will be described in detail hereinunder.

FIG. 4A shows the computer instruction format of the preferred embodiment. The instruction word is the first word of the grouping and resides in the main memory unit 21 of the DPS 10 at a location Y. Up to three operand descriptor words, or simply descriptor words, reside in contiguous locations Y+1, Y+2, and Y+3, the number of descriptor words being determined by the particular instruction word. The instruction word contains the operation code, OP CODE, which defines the operation to be performed by the CPU. A second field $MF_1$ is the modification field which describes the address modification that is performed for descriptor 1. A third field, the Variable Field, contains additional information concerning the operation to be performed and will differ from instruction to instruction. When descriptors 2 and 3 are present, the Variable Field will contain information to describe the address modification to be performed on these operands. The descriptor words can be either the operand descriptor or an indirect word which points to the operand descriptor.

The operand descriptors which describe the data to be used in the operation, and provide the address for obtaining it from the main memory unit 21 are shown in FIGS. 4B, 4C, and 4D. A different operand descriptor format is required for each of the three data types, the three data types comprising the bit string, alphanumeric, and numeric types. The field denoted Y defines the original data word address, C defines the original character position within a word of nine bit characters, B defines the original bit position within a 9 bit character, and N defines either the number of characters or bits in the data string or a 4-bit code which specifies a register that contains the number of characters or bits. CN defines the original character number within the data word referenced by the data word address. TA defines the code that defines which type alpha-numeric characters are in the data, i.e., 9 bit, 6 bit, or 4 bit. TN defines a code which defines which type numeric characters are specified, i.e., 9 bit or 4 bit, and S defines the sign and decimal type, that is leading sign-floating point, leading sign-scaled, trailing sign-scaled, or no sign-scaled, as follows:

| | | |
|---|---|---|
| TN - Bit 21 | = 0 | 9 bit data type |
| | = 1 | 4 bit data type |
| S - Bit 22, 23 | = 00 | leading sign, floating point |
| | = 01 | leading sign, scaled |
| | = 10 | trailing sign, scaled |
| | = 11 | no sign, scaled |

SF defines the scale factor, the scale factor being treated as a power of 10 exponent where a positive number moves the scaled decimal point to the right and a negative number moves the scaled decimal point to the left. The decimal point is assumed to be immediately to the right of the least significant digit.

Figure 5:
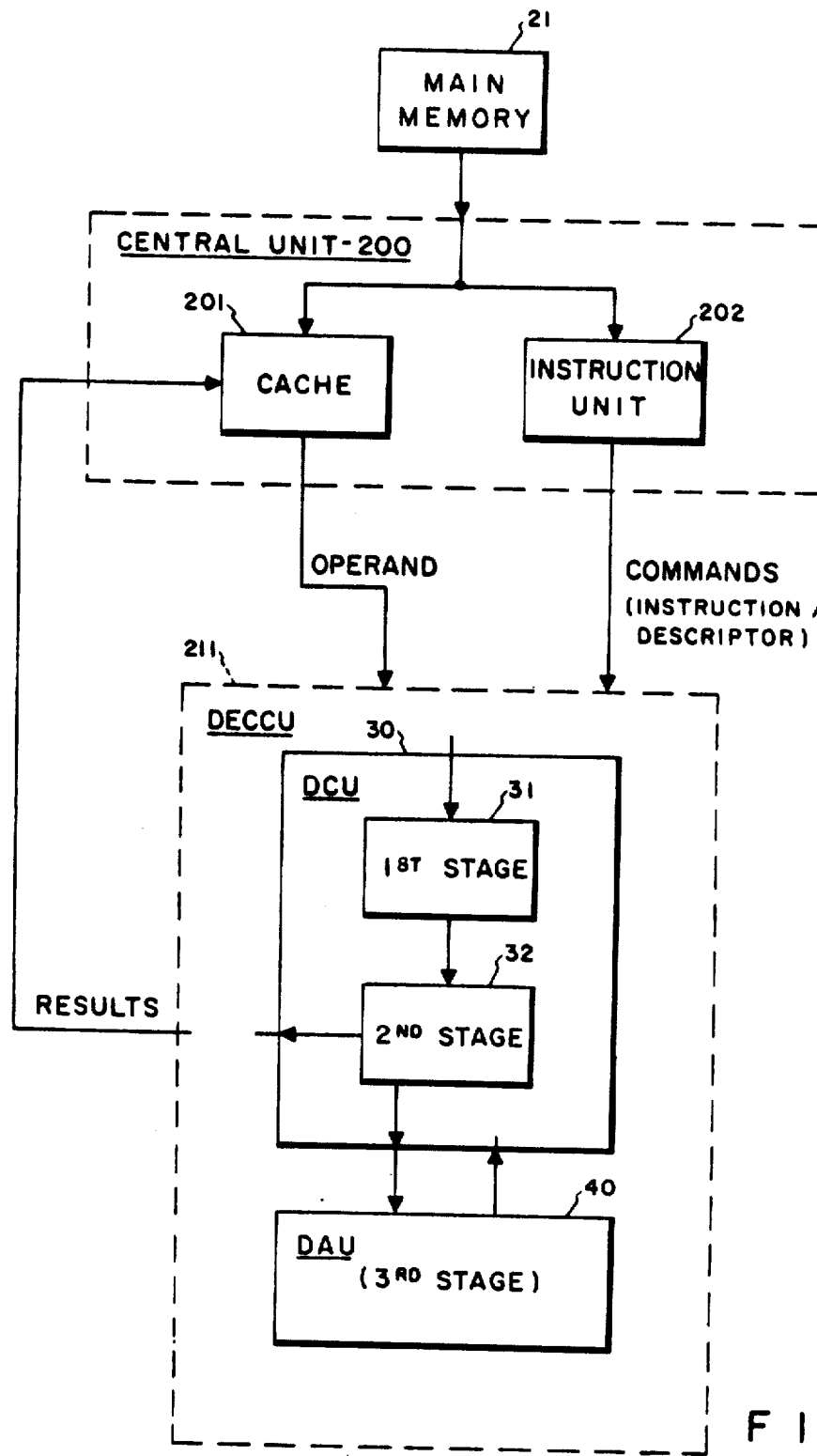
FIG. 5 shows a functional block diagram of the decimal character unit.

Referring to FIG. 5, there is shown the decimal character execution unit (DECCU) 211 in functional block diagram form. The DECCU 211 is the execution unit of the CPU 20 for a predetermined set of multiword instructions, including decimal arithmetic instructions, various character manipulation instructions, and instructions which operate on binary strings. The DECCU 211 is partitioned into two functional units, the character unit (DCU) 30 and the arithmetic unit (DAU) 40. The DCU 30 comprises two stages, a first stage 31, and a second stage 32. The DAU 40 comprises the third stage of the DECCU 211. The DECCU 211 receives operands from cache 201 and command information from instruction unit 202. The cache 201 and instruction unit 202 comprise the central unit 200 which is also operatively connected to main memory 21. Results from the DECCU 211 are transmitted to cache 201 (via the action of the collector 213 as discussed. The DCU 30 executes the character manipulation instructions including bit string instructions, and the DAU 40 executes the arithmetic instructions. The instructions executed by DECCU 211 are listed in Table 1. A complete description of each instruction is included in a Honeywell Software document entitled, "DPS 8 Assembly Instructions," copyright 1980 by Honeywell Information Systems Inc. (Order No. DH03-00), and can be referred to for more detailed information.

Figure 6:
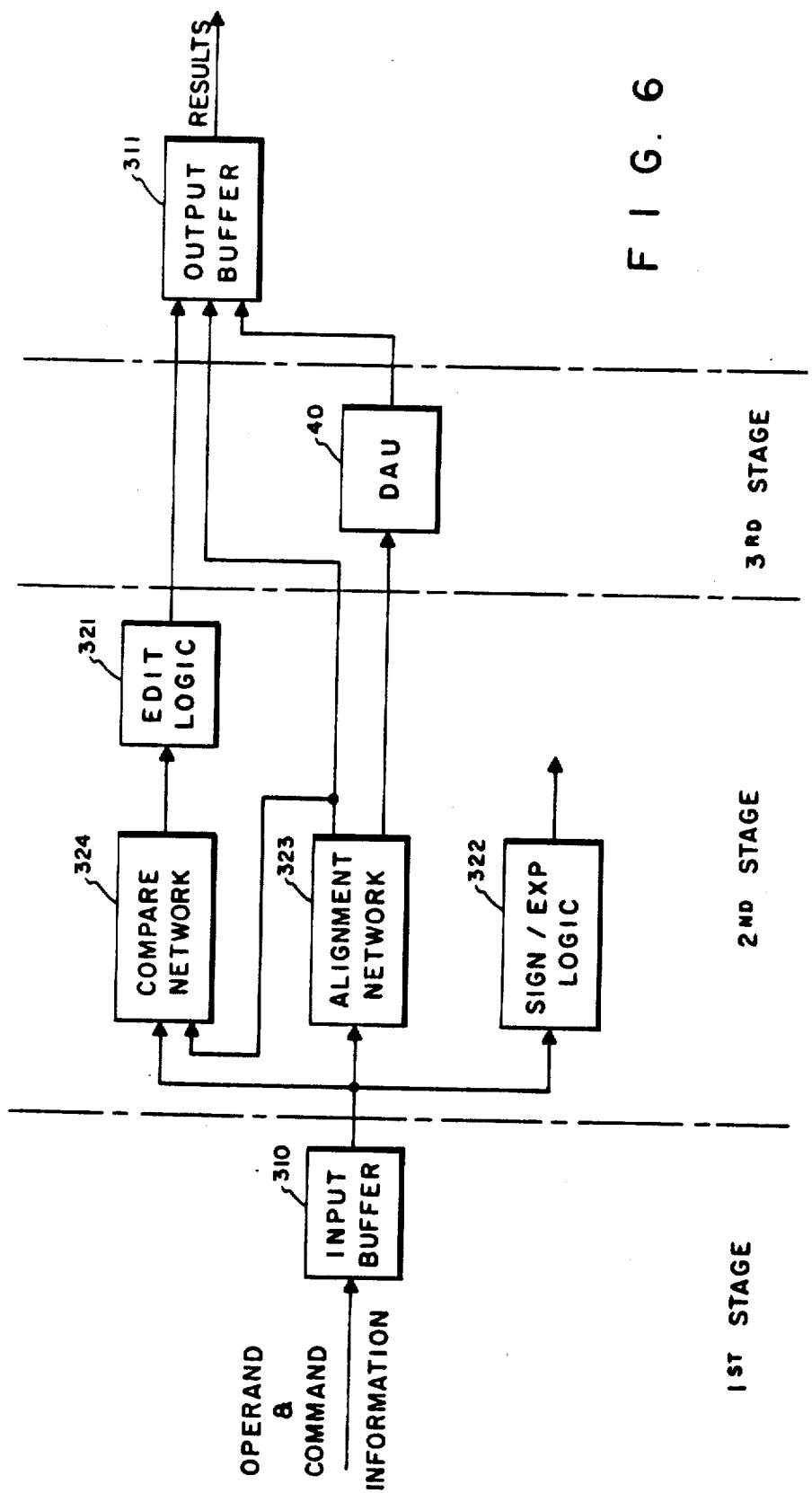
FIG. 6 shows a functional block diagram of the stages of the decimal character unit.

Referring to FIG. 6, a functional block diagram of the stages (or also referred to herein as levels) of the DECCU 211 is shown. The first stage 31 receives instruction and descriptor information from the instruction unit 202, and further receives the operand information from cache 201. The operands are stored in an input buffer 310 within the first stage 31, and the instructions are decoded and held in temporary registers and control flip flops of the first stage 31.

TABLE 1

| ALPHANUMERIC | |
|---|---|
| MLR | Move Alphanumeric LEFT to Right |
| MRL | Move Alphanumeric with Translation |
| CMPC | Compare Alphanumeric Character String |
| SCD | Scan Character Double |
| SCDR | Scan Character Double in Reverse |
| TCT | Test Character and Translate |
| TCTR | Test Character and Translate in Reverse |
| SCM | Scan with Mask |
| SCMR | Scan with Mask in Reverse |
| EIS NUMERIC | |
| MVN | Move Numeric |

TABLE 1-continued

| | |
|---|---|
| CMPN | Compare Numeric |
| AD3D | Add Using Three Decimal Operands |
| AD2D | Add Using Two Decimal Operands |
| SB3D | Subtract Using Three Decimal Operands |
| SB2D | Subtract Using Two Decimal Operands |
| MP3D | Multiply Using Three Decimal Operands |
| MP2D | Multiply Using Two Decimal Operands |
| DV3D | Divide Using Three Decimal Operands |
| DV2D | Divide Using Two Decimal Operands |
| EIS BIT STRING | |
| CSL | Combine Bit Strings Left |
| CRS | Combine Bite Strings Right |
| SZTL | Set Zero and Truncation Indicator With Bit Strings Left |
| SZTR | Set Zero and Truncation Indicator With Bit Strings Right |
| CMPB | Compare Bit Strings |
| EIS CONVERSION | |
| DTB | Decimal to Binary Convert |
| BTD | Binary to Decimal Convert |
| EIS EDIT MOVE | |
| MVE | Move Alphanumeric Edited |
| MVNE | Move Numeric Edited |
| NEW EIS MULTIWORD | |
| CMPCT | Compare characters and Translate |
| MRF | Move to Register Format |
| MMF | Move to Memory Format |
| TEN INSTRUCTIONS: EBCDIC/OVERPUNCHED SIGN CAPABILITY | |
| MVNX | |
| CMPNX | |
| AD3DX | |
| AD2DX | |
| SB3DX | |
| SB2DX | |
| MP3DX | |
| MP2DX | |
| DV3DX | |
| DX2DX | |
| MVNEX | Move Numeric Edited Extended |

Second stage 32 contains edit logic 321, sign/exp logic 322, alignment network 323, and compare network 324 required to perform the character manipulation and alignment operations. The output of the second stage 32 is either the final result which is transmitted to an output buffer 311 to be stored in cache 201, or is aligned data passed to the DAU 40. The DAU 40, which comprises the third stage of the DECCU 211, performs the arithmetic operation on the aligned data (arithmetic operation may also be referred to herein as numeric execution). Each stage of the DECCU 211 will be described in detail hereinunder.

Figure 7:
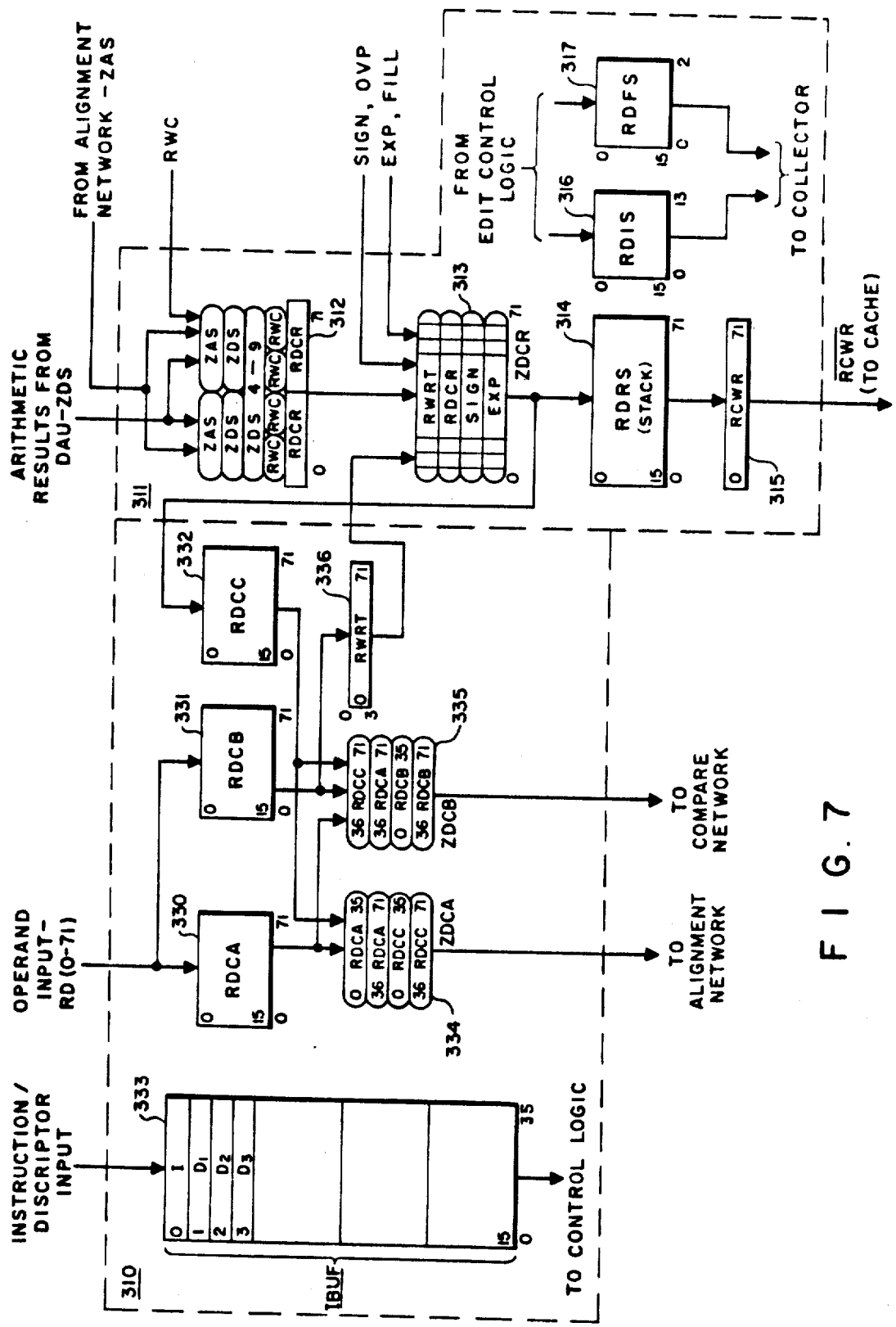
FIG. 7 shows a functional logic diagram of the input buffer and output buffer of the decimal character unit.

The input buffer 310 and output buffer 311 of the decimal character unit is shown in FIG. 7. The input buffer 310 comprises a first and second operand input stack, RDCA and RDCB 330 and 331, respectively (also referred to as stack A and stack B, respectively), a third stack RDCC 332 (also referred to as stack C), and an instruction/descriptor input buffer 333, IBUF. A first and second switch 334 and 335 (also denoted as the ZDCA and ZDCB switches, respectively) is included as part of input buffer 310. First switch 334 is operatively connected to stack A 330 and stack C 332 for transferring selected data, ZDCA, to alignment network 323. Second switch 335 is operatively connected to stack A 330, stack B 331, and stack C 332 for transferring selected data ZDCB to compare network 324. A rewrite register 336, RWRT, is operatively connected to stack B 331, the output of RWRT being connected to output buffer 311. The loading of IBUF 333, and the operand input stacks 330, 331 is from CUPS 204 and cache 201, respectively under the control of CUPS 204.

The IBUF 333 is a 16 word by 36 bit wraparound buffer. Upon receipt of an instruction available signal from CUPS 204, an instruction/descriptor word is read into the corresponding location of IBUF 333. IBUF is organized in 4 four-word blocks, thereby capable of storing up to a maximum of four instructions at a time. The first word of the block is for storing the instruction word I, the second word of the block is for the first descriptor word D1, the third word of the block is for the second descriptor word D2 and the fourth word of the block is for the third descriptor word, if any. The information contained in the instruction/descriptor words is transferred to the various control logic for the generation of control signals to effect the execution of the functions required to execute the instruction. An IBUF-full control signal is sent to CUPS 204 when IBUF 333 is full. The format of the instruction/descriptor words and the significant control signals are described in the related patent application, paragraph (4) identified above and incorporated by reference herein.

Operand input data (also denoted by signal name RD) is loaded into stack A 330 and stack B 331 as a function of the instruction. In the preferred embodiment, stack A 330 and stack B 331 are each 16 word × 72-bit memory devices. Double word writes are made into the operand stacks 330, 331 and can hold operands awaiting execution for a maximum of 4 instructions. When the DECCU 211 receives a control signal from CUPS 204 indicating operands are available, the operands are fetched by doubleword reads. The input operands are loaded into stacks A and B 330, 331 according to steering control signals. An operand full control signal is transmitted to the CUPS 204 from the DECCU 211 when either operand stack is full. A stack full signal from stack A 330 and a stack full signal from stack B 331 is ORed to generate the operand full control signal to CUPS 204. Operand 1 data is loaded into stack A 330, and operand 2 data is loaded into stack B 331 for character type instructions. Operand 1 and operand 2 data are loaded into stack A 330 for numeric-type instructions (instructions sometimes being referred to as operations or OPS). Rewrite data and translated data are loaded into stack B 331. The loading of the operands into the operand stacks is selected according to the instructions as shown in Table 2.

TABLE 2

| DECCU Instruction | Stack A RDCA | Stack B RDCB |
|---|---|---|
| MLR,MRL | OP1 | OP2 |
| MRF,MMF | OP1 | — |
| MVT | OP1 | OP2,OP3 |
| MVE,MVNE | OP1 | OP2,OP3 |
| TCT,TCTR | OP1 | OP2 |
| SCM,SCD | OP1 | OP2 |
| CMPC | OP1 | OP2 |
| CMPCT | OP1 | OP2,OP3 |
| CSL,CMPB,SZTL | OP1 | OP2 |
| DTB | OP1,OP2 | — |
| BTD | OP1 | OP2 |
| MVN | OP1,OP2 | OP2 |
| AD2D,MP2D | OP1,OP2 | ·OP2 |
| AD3D,MP3D | OP1,OP2 | OP3 |
| CMPN | OP1,OP2 | — |
| LPL,SPL | OP1 | — |

Operand data can be read from stack A 330 a double word at a time if it is to be packed 9-bit to 4-bit. This can occur with unpacked numeric operands and the MLR and MRL instructions. Otherwise the operand data is read on a single word basis. Operands from stack B 331 are single word reads. Rewrite data from stack B 333 is loaded into the RWRT (the rewrite register) 336 by a double word read. It can be seen that either a double word can be selected from stack A 330 or two single words from stack A 330 and B 331 by the ZDCA and ZDCB switches 334, 335, but not both.

DECCU numeric results are stored in stack 332 as well as result stack RDRS (the result stack will be described in detail hereinunder in conjunction with the output buffer 311) in case the result is to be one of the input operands for a numeric instruction immediately following. The normal operand fetches for that operand are cancelled, and that operand is read instead from stack C 332 thereby eliminating the delay introduced by a store-load break. Wraparound data from stack C 332 can be read on either a double word or single word basis just as if the operand were in stack A 330. The selected operand data, ZDCA and ZDCB, are sent to the alignment network 323 for alignment, to the compare network 324 for character comparison and selection, and to the sign/exp logic 322 to extract signs and exponents.

The control logic (not shown) generates the read and write addresses for the stack A 330, stack B 331, and stack C 332. The control logic also generates the select controls for the ZDCA and ZDCB switches 334, 335. In addition, the control logic generates data available signals that allow the input registers of the alignment network 323 and the compare network 324 to be loaded. The control logic signals the CUPS 204 when ten or more locations in either stack A 330 or stack B 331 are used to prevent writing over good data.

The output buffer 311 comprises a 1-of-4 select double word register 312 (more simply referred to as the RDCR register), having inputs ZDS, arithmetic results from DAU 40, ZAS from alignment network 323, and resultant output from edit logic 321 (RWC register to be discussed hereinunder). An output buffer select switch 313 (or more simply referred to as ZDCR switch) receives inputs from RDCR register 312, RWRT register 336, the sign, OVP data from sign/exp logic 322, and the EXP, FILL data from compare network 324. The data selected by the ZDCR switch 313 is stored in a results stack RDRS 314. The results stack RDRS 314 is a 16 word by 72 bit memory device or stack. The results stack 314 stores data to be stored in cache 201 via a RCWR register 315. The output buffer 311 also includes an indicator results stack 316 and a fault results stack 317. Indicator results stack 316 is a 14 bit × 16 high stack, and fault results stack 317 is a 3 bit × 16 high stack. Inputs are received from edit control logic and output results are transferred to the collector 213.

Figure 8:
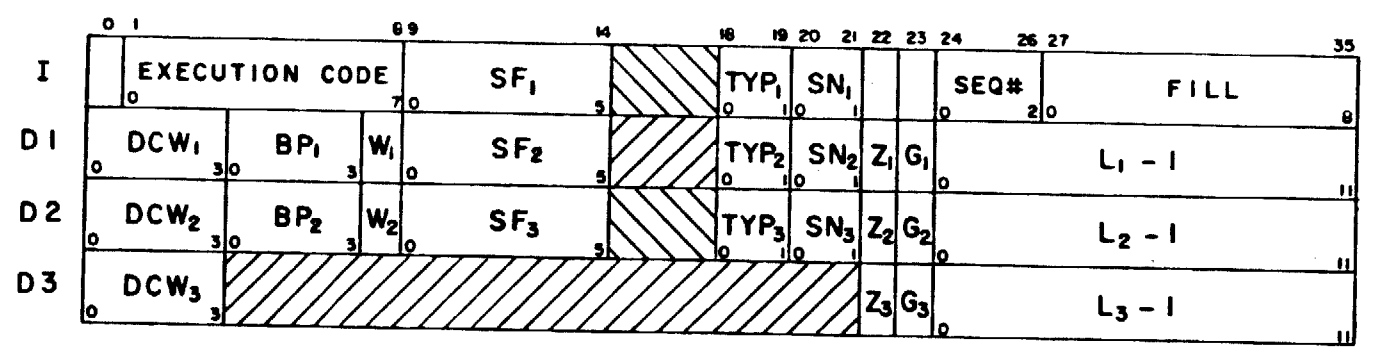

The format of the DECCU instruction/descriptor words is shown in FIG. 8. The words are generated by the CUPS 204 in the format shown. The instruction word includes the scale factor and sign information of the first operand. This format is important from timing considerations which will be described in detail hereinunder. SF, indicates scale factor for numeric operands. TYP identifies the data type as follows: 00 for 9-bit format, 01 for 6-bit data, and 10 for 4-bit data. SN indicates sign and decimal type for numerics. SEQ# indicates a sequence number and FILL is the fill character field. DCW indicates position within double word of first character, BP indicates position within first byte of first bit, and W indicates this operand is in stack C 332.

Ln indicates the length of operand n, Zn is set if LN is zero, and Gn is set if Ln is greater than 256.

Figure 9:
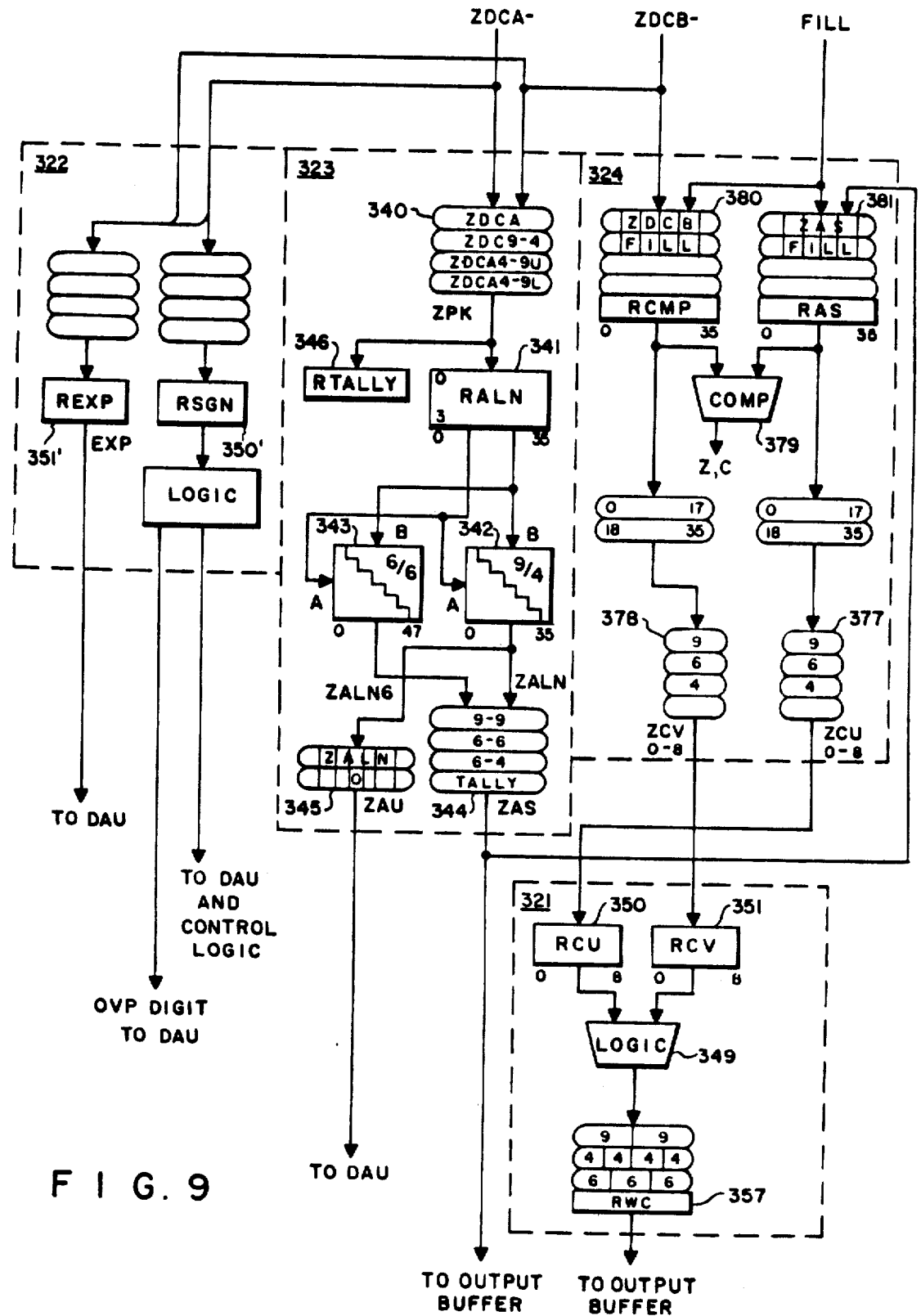
FIG. 9 shows a system logic diagram of the second stage of the decimal character unit.

A system logic diagram of the second stage of DECCU 211 is shown in FIG. 9. The second stage, the execution stage for character-type instructions, comprises the alignment network 323, compare network 324, sign/exp logic 322, and edit logic 321. The second stage receives operand input data ZDCA and ZDCB via first stage ZDCA switch 334 and ZDCB switch 335. More specifically, operand input data ZDCA and ZDCB is inputted to an input alignment switch 340 (or more simply denoted the ZPK switch) of the alignment network 323, and an input sign switch 350' and an input exponent switch 351' of sign/exp logic 322. Input operand data ZDCB is inputted to a first 1-of-4 select register 380 (or more simply denoted the RCMP register) of compare network 324. The FILL character data is inputted (from a register of the control logic (not shown) which contains the FILL character data for the instruction being executed, which is included in the instruction word, or I word) to a second 1-of-4 select register 381 (or more simply denoted the RAS register) of compare network 324 and the first 1-of-4 select register 380. The output of the second stage is either the final result of an operation which is transmitted to the output buffer 311, or is aligned data transmitted to the DAU 40 for an arithmetic operation.

The alignment network 323 comprises the ZPK switch 340 operatively coupled to an alignment register 341 (or more simply the RALN register). The RALN register is coupled to a 9/4 shift network 342 and a 6/6 shift network 343. The 9/4 shift network 342 and the 6/6 shift network 343 are in turn coupled to a first alignment output switch 344 (or more simply the ZAS switch), and a second alignment output switch 345 (or more simply the ZAU switch). A register, RTALLY 346, is utilized to maintain a tally count which will be described further hereinunder.

Compare network 324 includes the RCMP register 380 and the RAS register 381 for storing operand 1 (OP1) and operand 2 (OP2). A comparator 379 is included which compares OP1 to OP2 and outputs a zero and carry signal (Z and C). The OP1 and OP2 data are passed to respective output switches 377 and 378, denoted ZCU switch and ZCV switch, respectively.

The edit logic 321 receives the ZCV and ZCU data into respective RCV register 351 and RCU register 350. The data is combined by logic 349 to operate on the data to effect execution of the instruction. The data is then formatted in results register 357 RWC and transferred to the output buffer 311. The sign/exp logic 321 provides the logic for extracting the sign and exponent. A more detailed description of the logic of the second stage of the DECCU 211 is provided in the application of Related Patent Applications, Par. (4).

The control logic for implementing the method of the present invention will now be described. Referring to FIG. 10, there is included a block diagram of the preferred embodiment of the control logic for implementing the method of the present invention. The first operand input stack 330 (stack A) stores operand data, stack A of the preferred embodiment being a 16 high × 72 bit stack. As mentioned above, the computer word of the preferred embodiment is a 36-bit word. Therefore, each addressable location of the stack A 330 is a double word. The stack A 330 is divided into an even and odd half, each half storing single computer words, bits 0–35 define the even half of the stack and bits 36–71 define the odd half of the stack. Control logic 500, which controls the reading and writing of operand data into stack A 330, includes a write address register (RDCA-WA) 501 and a read address register (RDCA-RA) 502, both registers being operatively connected to stack A 330. Operand data from the central unit 200 is stored into sequential locations indicated by a write address value stored in the write address register RDCA-WA 501, the write address value denoted herein as the write address pointer (WA or WA pointer), and the write address value being incremented by one by an adder ADD 503. The first write address value of a set of data is also a starting address value for that data set, and is stored in a starting address register (RDCA-SA) 504. The starting address register 504 of the preferred embodiment of the control logic 500 is a 4-high×4-bit bank of registers. Since as many as four sets of operand data can be stored in stack A 330 (a data set being associated with an instruction), four starting address values (SA or SA pointer) can be stored in the starting address register 504 and four bits are required to address the 16 locations of stack A 330 (the numbers in the parenthesis of FIG. 10 indicate the bits, e.g., 0-3 references bits 0 through bits 3). The starting address register 504 is operatively connected to the read address register 502 through a start address switch 505.

The start address switch 505 operates to load the read address register 502 with either the start address value or the sum from ADDER2 403, the output of start address switch 505 being denoted as ZDCA-RA(0-4). The start address value stored in the starting address register 504 is concatenated with a WA-4 signal (one bit, bit 4 of WA, whereby a 0 value indicates the even half of stack A, and a 1 value indicates the off half of stack A) and makes up the RDCA-SA:WA-4 signal. The sum from ADDER2 403 comprises the ADCA-RA signal. The WA-4 signal is the output of odd/even memory switch 510. The WA-4 signal (from odd/even select switch 510), which indicates the odd or even half of memory for single word reads, is generated by selecting the word bit from the IBUF 333 for the operand to be read, namely, bit 0 of D₁ for operand 1 and bit 0 of D₂ for operand 2. Since double word reads are performed on double word boundaries (i.e., from bits 0 to 71), the WA-4 signal from odd/even select switch 510 for double word reads is a logic '0'.

Included as part of control logic 500 is ADDER1 506 which adds the length of the operand (L-1) and the position within the double word of the first character (P). These quantities are received from CUPS 204 as discussed above in conjunction with FIG. 8. Still referring to FIG. 10, the output of adder 1 506 indicates the number of double words minus one which are to be loaded and defined as signal APR (0-4). The APR signal is loaded into a constant register (RDCA-K) 507 via an APR switch 508 and a constant switch 509. The output of APR switch 508 is a ZAPR signal which is either the APR signal or two times the APR signal, the APR signal being utilized for four-bit data format words and two times the APR signal being used for the nine-bit data format words. ADDER1 506 and APR switch 508 are utilized for detecting a predetermined trailing character, described more fully in the application of related patent applications par (5). ADDER2 403 generates the read address by adding the current read address stored in read address register 502 to a constant value stored in the constant register 507, the resulting sum being loaded in read address register 502 via start address switch 505. The constant switch 509 is utilized in part for controlling the selection of single word reads or double word reads of stack A 330 and for controlling the forward or reverse read of the operand data stored in stack A 330 as will be described in further detail hereinunder. Although not shown, it is understood that a duplicate set of control logic 500' exists for stack B 331 (the reference numerals with a prime denote the duplicate element for the stack B control logic).

Figure 11:
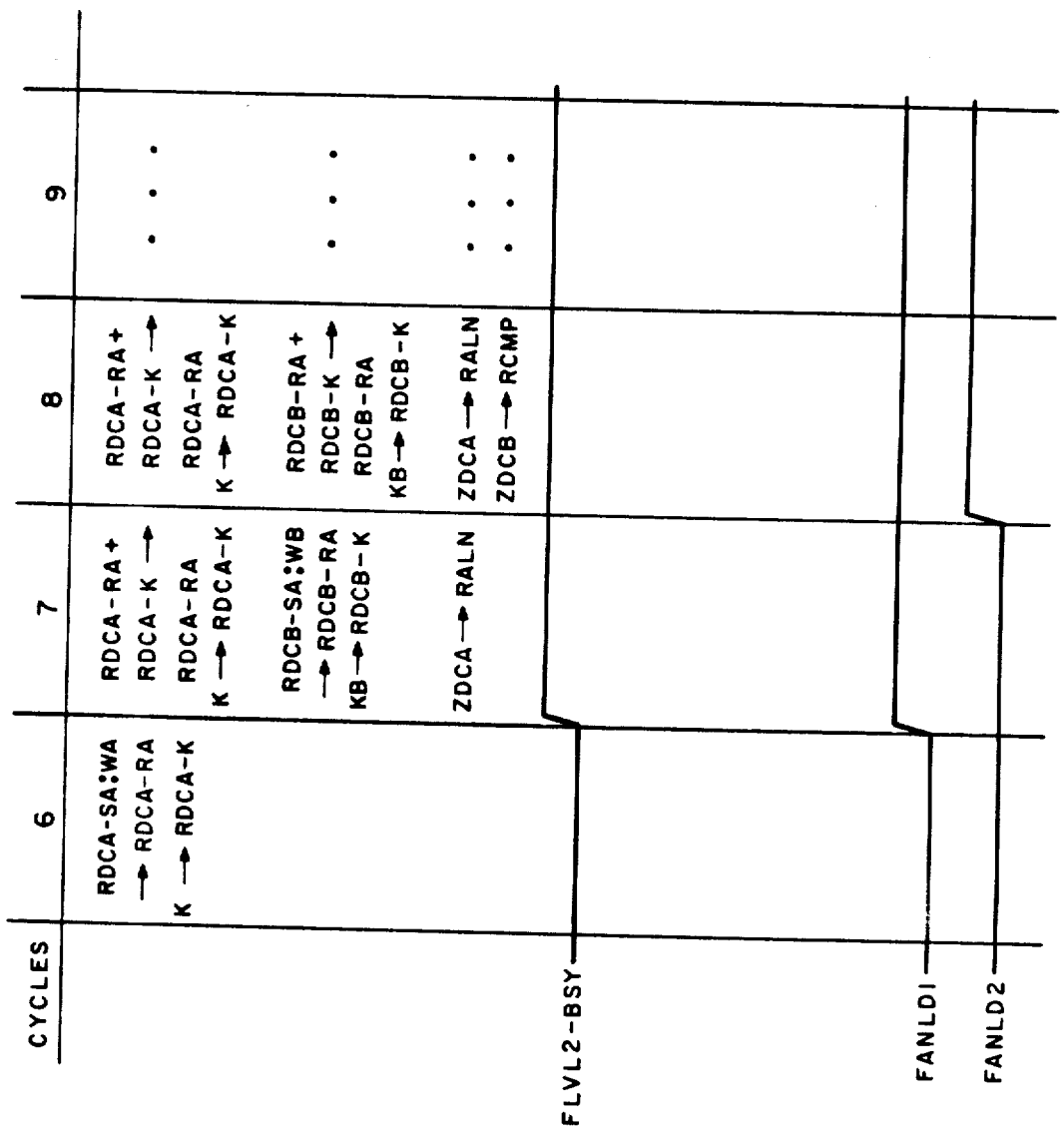
FIG. 11 shows a timing diagram of the steps performed in the overall operation of the present invention for the reading of the temporary storage memory.
Figure 12:
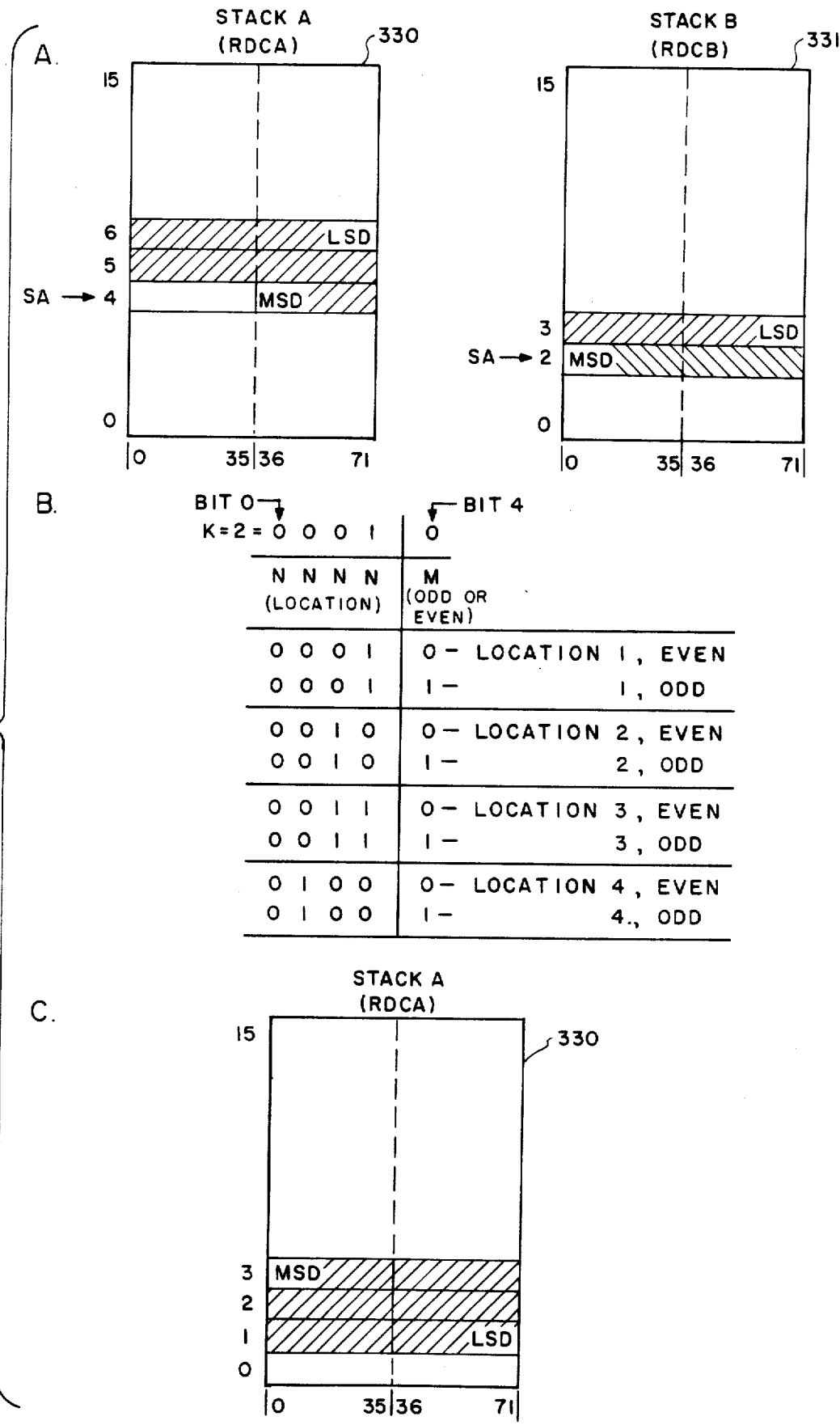
FIG. 12 shows stack A and stack B loaded with operand data.

The operation of the preferred embodiment of the control logic 500 will now be described in conjunction with FIGS. 10, 11 and 12. FIG. 11 shows a timing diagram of the steps performed in the overall operation of the control logic 500 for the reading to stack A 330 in a forward or reverse direction. For purposes of example, and in no way intended to limit the present invention, assume that operand data is loaded into stack A 330 (RDCA) and stack B 331 (RDCB) starting at location 4 and location 2, respectively, as shown in FIG. 12A, a cross-hatched area denoting the words to be read. Further, for purposes of example here, the first word to be read from stack A 330 is in the odd half of location 4 of stack A 330, and the first word to be read from stack B 331 is in the even half of location 2. In the execution of the instruction shown here starting at cycle 6, such as a CMPC instruction, the operand data stored in stack A 330 will be read. The starting address of the data in stack A 330 will have a binary value of 4 (0100) in this example. Thus, the starting address register (RDCA-SA) 504 will contain the starting address value of 4. The starting address value contained in starting address register RDCA-SA 504 will be selected by start address switch 505 along with the WA-4 signal which indicates the odd or even half of memory, in this example the WA-4 signal will hve a value of 1 indicating the odd half of memory. The start address switch 505 initially selects switch position 0 and subsequently selects switch position 1. Therefore, the read address register 502 will contain the RDCA-SA:WA-4 value, that is, the start address value concatenated with the WA-4 signal (a resultant binary value of 01001). Constant switch 509 selects position 0 such that constant register 507 will contain a binary value of 00001. Switch position 0 of constant switch 509 is for forward single word reads, switch position 1 (a constant value of 2) is for forward double word reads, the switch position 2 whereby XXX varies between logic one and logic zero, i.e., a value of −1 and +3 is for reverse reads. Position 0 of constant switch 509 is selected here since single word reads from the stack are to be performed, i.e., a single word of 36 bits is to be read.

During cycle 7, the stack A 330 location is read as specified by the read address register 502, in this example the odd half of location 4 will be read and directed to the alignment register 341. Also, the control signal FANLD1 is set to enable the loading of the operand into the RALN register 341. Also, during cycle 7, the reading of stack B 331 is initiated. The starting address value of stack B, in this example a value of 2, which has been stored in the starting address register for stack B (RDCB-SA) 504' is loaded into the read address register for stack B (RDCB-RA) 502'. [Note here that the prime signal indicates the equivalent elements for the control for stack B.] Also, the constant KB is loaded into the constant register for stack B (RDCB-K) 507'. Also during cycle 7, the value initially stored in the read address register 502 (01001 binary) is added to the value stored in the constant register (00001 binary) by ADDER2

403, and stored in the read address register 502 through the start address switch 505, the start address switch on subsequent cycles selecting position 1 (i.e., the ADCA-RA signal).

During cycle 8 the value now stored in read address register 502 (01010 binary), the value specifying the even half of location 5 of memory, is now read and transmitted to the alignment register 341. The value stored in the read address register 502 (01010 binary) is added to the value stored in the constant register 507 (00001 binary) and transmitted to the read address register 502. The constant register 507 is loaded with constant K (position 0, having a value of 00001 binary).

Also during cycle 8, the value stored in read address register RDCB-RA 502' (having a value of 00100 binary) specifies the location to be read from stack B 331, namely the even half of memory of location 2. The word read from stack B 331 is transmitted to the RCMP register 380 of the compare network 324. The control signal FANLD2 is raised to enable the loading of the data read from stack B into the RCMP register 380. The value stored in the read address register RDCB-RA 502' (00100 binary) and the value stored in constant register RDCB-K 507' (a value of 00001 binary) is added by ADDER2 403' resulting in a sum having a value of 00101 binary, this value specifying the odd half of location 2 of memory, and is directed to the read address register RDCB-RA 502'. Cycle 9 repeats the steps of cycle 8, reading the next sequential word from the stack from the respective stacks, until cycle 11 when all the data has been read.

From the above example, it can be seen that adding a constant of +1 to the old read address value achieves the forward single word read operation. Since the address of stack A 330 is defined by the upper four bits N of FIG. 12B (i.e., bits 0–3 of the read address value in read address register 502), and bit 4 (M of FIG. 12B) indicates the odd or even half of the stack A 330, it can be seen that adding a constant of +1 increments the address location every second addition (or every second add cycle). The even half of memory is addressed first and the odd half of memory is addressed second. Since the data is loaded most significant digit (MSD) first, as shown in FIG. 12A, the above described sequence of reading achieves the operand data read in the forward direction. It can also be seen that a constant of +2 adds a one to the address value each cycle, resulting in a sequential double word read. The M bit (WA-4 signal from the odd/even memory select switch 510) is a logic 0 for double word reads, as discussed above.

For a reverse single word read, the operand data is loaded in stack A 330 as shown in FIG. 12C by the central unit 200, i.e., least significant digit (LSD) first. For reverse reads, it is desired to read the data out LSB first. In order to achieve the desired read sequence, the read sequence must be reversed, i.e., the odd half of memory must be addressed first and the even half of memory for the same location must be addressed second. in this case, the initial value loaded into the read address register is 00011 binary indicating the odd half of location 1 of stack A 330 (this is the value of the RDCA-SA:WA-4 signal). On the next cycle the constant of −1 is added to the value contained in the read address register 502. This is achieved by selecting switch position 2 of constant switch 509 in which the values of X are caused by control logic (not shown) to have a logic 1 value. This results in an output signal ADCA-RA from ADDER2 403 to have a 00010 binary value which is the even half of location 1 of stack A 330. This is the location read out on this cycle. On the subsequent cycle, a constant of +3 is added to the value of the read address register 502, the value in the read address register now being 00010 binary. The constant of +3 is formed by the control logic causing X to have a logic 0 value which when added to the contents of the read address register 502 results in a sum (ADCA-RA signal) of 00101 which is the odd half of location 2. Thus it can be seen that a reverse single word read occurs by causing the constant values selected to vary between −1 and +3 on alternate cycles. It can also be seen that the reading of stack A 330 is always performed in the same direction, i.e., the location value always increments in the same direction. If, for reverse operand data reads, the operand data were loaded as shown in FIG. 12A, (i.e., as compared to the loading arrangement of FIG. 12C), then in order to read the LSD first, the RA pointer for the LSD must be determined and saved for initializing the read address register 502 upon completion of the read. The loading arrangement of FIG. 12C is easily achievable by the CUPS 204, and is at a "non-critical" time, i.e., not during instruction execution, whereas any additional steps performed by the control logic 500 increases the instruction execution time.

Cycles 1 through 5 are utilized by the central unit 200 to fetch and decode the instruction as explained in detail in related application, noted in paragraph (4) above. The control signal FLVL2-BSY indicates the second stage of the DECCU 211 is busy. It was assumed in the above example that the stack A 330 and stack B had been loaded sometime prior to cycle 6.

Figure 13:
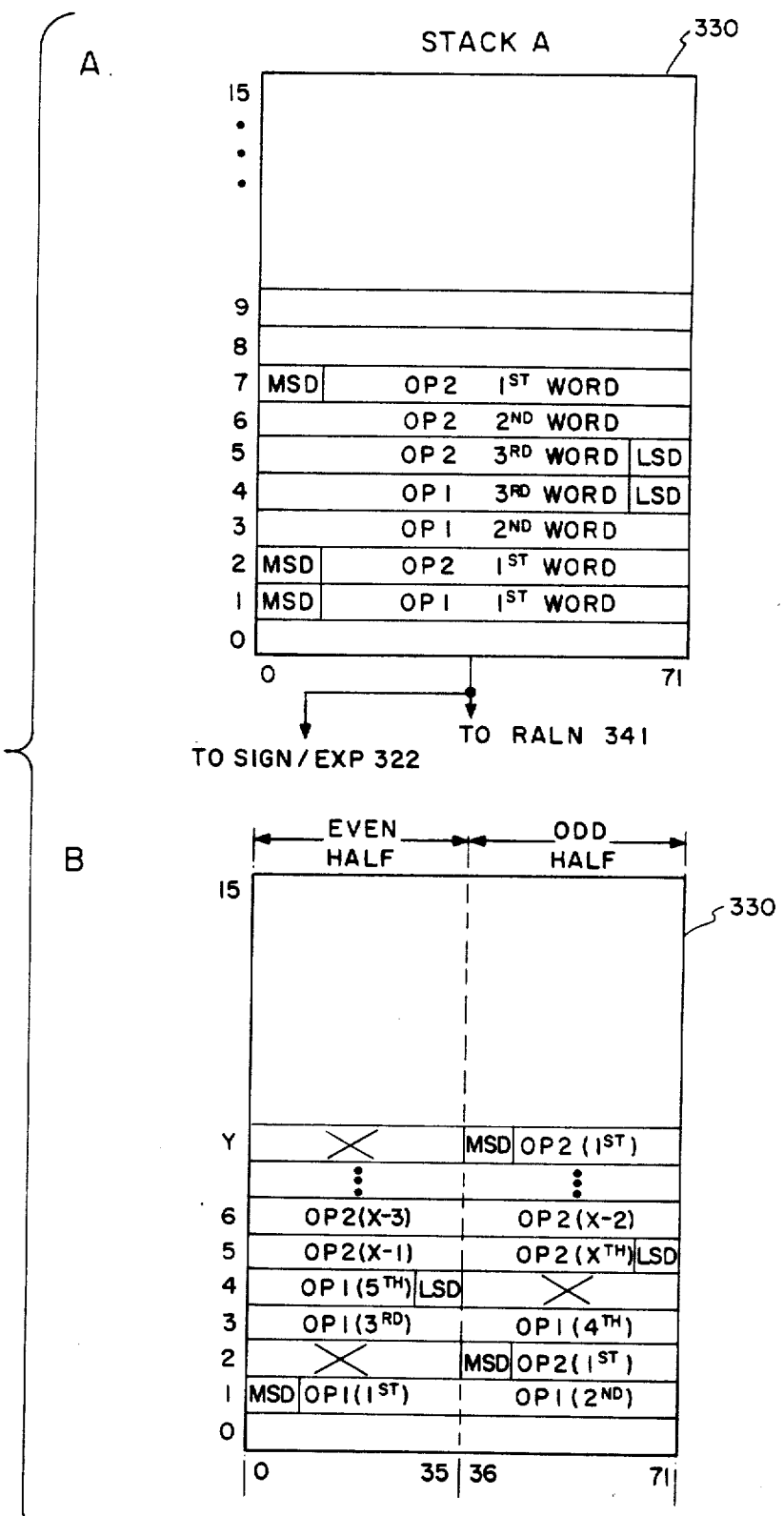
FIG. 13 shows the temporary storage memory loaded with operand data which is used in an example for describing the steps performed by the control logic.

Utilizing the features of the control unit 500 discussed above, the method of the present invention will now be described in conjunction with FIGS. 13 and 14. FIG. 13A shows stack A 330 loaded with operand 1 and operand 2 data, OP1 and OP2, respectively, which will be utilized in the example to be described below. The operands of FIG. 13A are double word operands (i.e., 72 bits) which may be unpacked data (i.e., 9 bit byte data described above) which are to be packed into 4-bit byte data. Likewise, FIG. 13B shows stack A 330 loaded with single word (i.e., 36 bit words) operand 1 and operand 2 data which will be used in a second example to be described below. FIG. 14 shows a flow diagram of the steps performed by the control logic 500 in reading the operand data from stack A 330.

In order to start the numeric operation as the data is being read out of stack A 330, it is critical that the sign of the operands be known. Also, since the arithmetic operation starts with the least significant digit and progresses to the most significant digit, it is desirable to start reading the second operand data from the least significant digit first to the most significant digit. Therefore, for purposes of example and in no way intended to limit the present invention, the operand data (unpacked data) is loaded into stack 330 A by the CUPS unit 204 as shown in FIG. 13A. Referring to FIG. 13A, the operand data will be read starting from the first location, location 1, up to and including location 7 sequentially. The first word of operand 1 data is read first followed by the first word of operand 2 data. In both cases, the MSD digit will be obtained. If the character format has the leading character sign format discussed above, the sign will be directed to the sign/exp 322 unit and stored for subsequent use. The operand data as it is read from stack A 330 is directed the RALN 341 register to be aligned and packed into 4-bit data as discussed above. Next, the operand 1 words are read in sequence as stored in stack A, i.e., the second word and the third word of operand 1 data are read. If the operand 1 data format has a trailing sign, the sign for operand 1 will be obtained and stored for subsequent usage. Operand 2 data is then read sequentially starting from location 5, and subsequently location 6 and location 7 are read. It should be noted that operand 2 data is loaded in stack A 330 in reverse order such that OP 2 data is read LSD first. If operand 2 data is of the trailing sign format then the first digit obtained, i.e., the LSD digit, will be the sign. Thus, the arithmetic operation can start since the sign of the two operands will be known and the least significant digit of the second operand will be read first allowing the desired sequence to occur; namely, the least significant digit to most significant digit reading of operand 2 data will occur.

The control logic 500 operates in accordance with the steps of FIG. 14A which will now be discussed. Once operand data is to be read from stack A, the read sequence starts (block 600) and the operand data read of single or double words is established (block 605). In this example, since double word reads are to be performed, constant switch 509 is selected such that the constant of K=2 will be selected (block 610). Read address register 502 is loaded with the start address (SA) from the starting address register 504, in this example the starting address will be location 1 (block 615). A read cycle is then initiated which reads the first word (block 620). From this point forward subsequent updates of the read address register 502 will be from ADDER2 403 which is the result of adding the contents of the read address register 502 and the constant K stored in the constant register 507. The output of ADDER2 403 denoted as ADCA, is selected via the APR switch 508 (block 625). A second read cycle is then initiated (block 630) which reads the second word of data, i.e., the first operand 2 data word. The remainder of operand 1 data is read and loaded into the RALN register 341 in register positions 0 and 1, alternately (blocks 635, 640). The remainder of operand 2 data is then read and stored into the RALN register 341, register positions 2 and 3, alternately, as discussed above (blocks 645, 650). When the operand 2 data read is completed the end of the read sequence occurs (block 655).

Again, for purposes of example and in no way intended to limit the present invention, single word data is stored in stack A 330 in a manner as shown in FIG. 13B. Referring to FIG. 13B, the data stored in stack A 330 of FIG. 13B is loaded by the CUPS unit 204. When the control unit 500 initiates reading the data from stack A 330, the first word of operand 1 data is read first followed by the first word of operand 2 data. (Note that the format of word 2 of stack A 330 is the same as that of the last word of the operand data, word Y, since stack A is loaded by CUPS 204 in double-word loads. The format is not significant since it is only desirable to obtain the MSD (i.e., sign) of OP2 at this time.) In both cases, the MSD digit will be obtained for both operand 1 and operand 2 data. Again, this allows obtaining the sign of both operand 1 and operand 2 data for the leading character sign format. Next, the remainder of operand 1 data words are read in sequence as stored in stack A 330, i.e., the second word of operand 1 is read followed by the third word of operand 1, up to the last word of operand 1 data, in this example the fifth word of operand 1 stored in the even half of location 4 being the last word of the operand 1 data. This last word contains the least significant digit such that the sign of operand 1 data will be obtained at this time for trailing sign character formats.

Operand 2 data is then read. The data is placed in stack A 330 by the CUPS unit 204 in the reverse order such that the first operand 2 data word to be read is the last word of the OP 2 data string. (The Xth word is the last OP 2 data word in this example, where X is not necessarily equal to 5, i.e., the length of OP 2 data string does not have to be the same length as the OP 1 data string.) In this example, the Xth word of OP 2 data is in the odd half of location 5 of stack A 330. The next word to be read (the X-1 word of the OP 2 data) is in the even half of location 5 of stack A 330. As discussed above the reverse reads must then be initiated by the control unit 500 in order to read the OP 2 data from stack A 330 in the proper sequence.

Figure 14B:
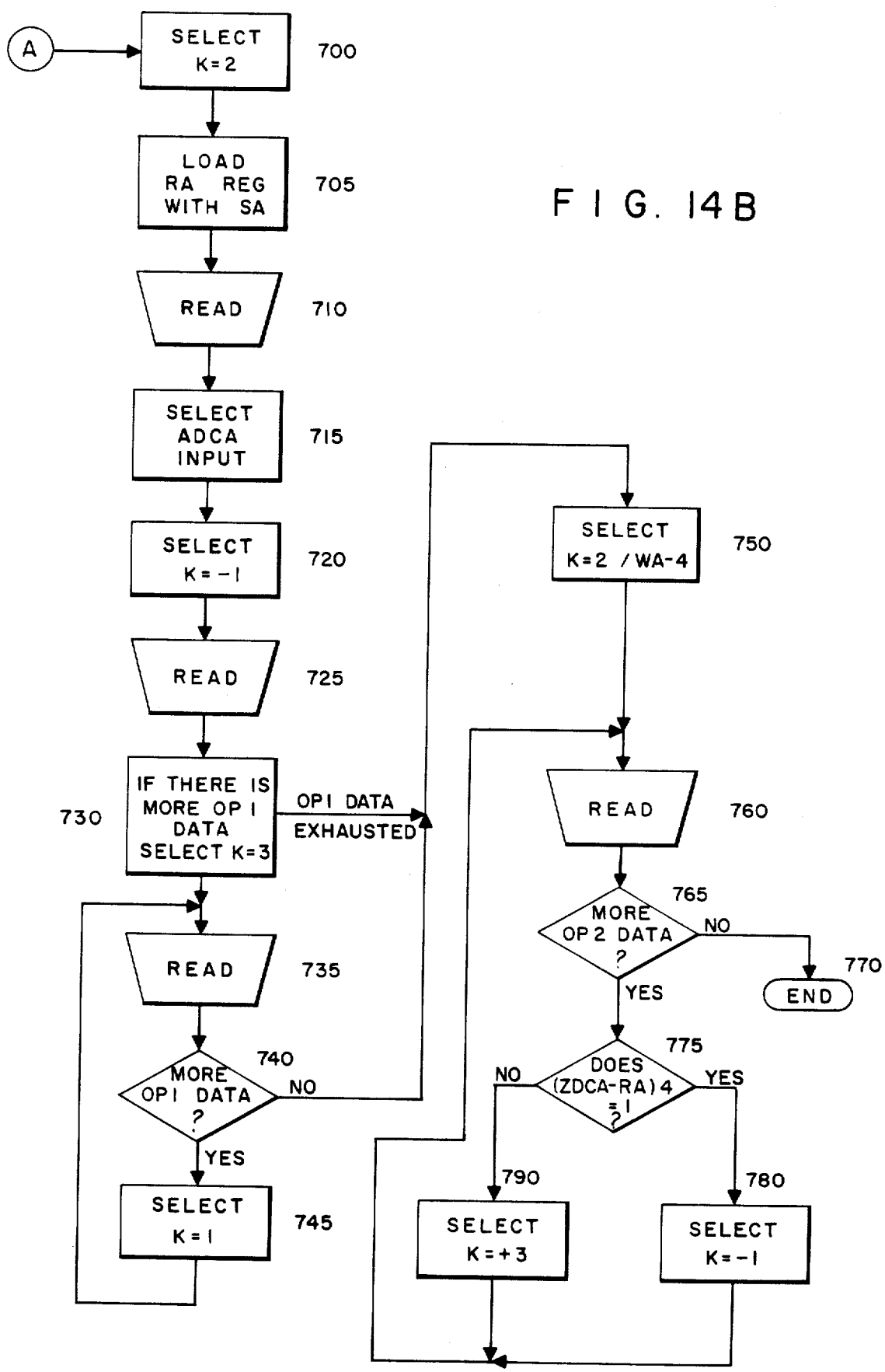

The control logic 500 operates in accordance with the steps of FIG. 14B for reading single word operand data and will now be discussed. Constant switch 509 is selected such that the constant of K=2 will be selected (block 700). Read address register 502 is loaded with the start address (SA) from the starting address register 504, in this example the starting address will be location 1 (block 705). A read cycle is then initiated which reads the first OP 1 word (block 710). From this point forward subsequent updates of the read address register 502 will be from ADDER2 403 which is the result of adding the contents of the read address register 502 and the constant K stored in the constant register 507. The output of ADDER2 403, denoted as ADCA, is selected via the APR switch 508 (block 715). A constant of K=−1 is selected and stored in constant register 507 (block 720), and a read cycle initiated (block 725). This read, as a result of updating the read address value by +2 in block 700, reads the first word of OP 2 data. If more OP 1 data is to be read, the constant of K=3 is selected (block 730), and a read cycle is initiated (block 735). The read performed in block 735 reads the second OP 1 data word, which is a result of adding a constant of −1 to the read address value. The constant of 3 allows the third OP 1 data word to be read on the next read cycle. The constant of 3 is selected in order to skip over location 2 which contains the first OP 2 data word read above in block 725. If more OP 1 data is to be read (block 740), a constant of +1 is selected (block 745), and the read cycle performed in block 735 is repeated.

If in block 730 or block 740 no more OP 1 data words are to be read, a constant of K=2 is selected and the WA-4 signal for descriptor 2 from the odd/even select switch 510 is enabled in order to select the odd half of stack A 330 at the start of the OP 2 data, in this example the WA-4 signal selecting the odd half of location 5 (block 750). A read cycle is initiated (block 760). A determination is made if more OP 2 data is to be read (block 765). If no more OP 2 data is to read, the read sequence ends (block 770). If more OP 2 data is to be read, the least significant bit of ZDCA-RA, i.e. (ZDCA-RA)$_4$, is checked to determine whether it is zero or one (block 775). If bit (ZDCA-RA)$_4$ is a one, a constant of K=−1 is selected (block 780), and the read cycle of block 760 is again repeated. If bit (ZDCA-RA)$_4$ is a zero, a constant of +3 is selected (block 790), and the read cycle of block 760 is repeated. Alternately selecting the constants between −1 and +3 by blocks 780 and 790, respectively, causes a reverse read of the operand data from stack A 330, as discussed above.

Hence, the operand 2 data is read in a reverse sequence, that is least significant digit is read first up to the MSD. Also, the sign of both OP1 and OP2 will be available prior to any operation between OP1 and OP2, for both trailing or leading sign formats, thus achieving the desired objective.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. A method of obtaining first and second operand data strings from a memory unit, wherein said first and second operand data strings are utilized in executing an instruction, and wherein said first and second operand data strings each includes at least one operand data word, each operand data word having a predefined format such that a predetermined group of bits of said operand data word defines a digit, said digit being a sign character or a numeric character, and wherein the first operand data word of each of said operand data strings contains a most significant digit, and the last operand data word of each of said operand data strings contains a least significant digit, said method comprising the steps of:

(a) loading said operand data words of said first and second operand data strings in a pre-established order in said memory unit; and (b) fetching said operand data words, in sequential order from said memory unit, such that the operand data words of the first and second operand data strings having the most significant digit are fetched first, the remainder of said first operand data words are fetched next, and the remainder of the second operand data words are fetched in a reverse direction, such that the operand data word having the least significant digit is fetched first, thereby allowing a predetermined arithmetic operation designated by an arithmetic instruction to begin on the first and second operand data strings while the second operand data words are being fetched.

* * * * *